(12) United States Patent
Weilkes et al.

(10) Patent No.: US 8,310,654 B2
(45) Date of Patent: Nov. 13, 2012

(54) METHOD FOR THE DETECTION OF SURROUNDINGS

(75) Inventors: Michael Weilkes, Diekholzen (DE); Rudolf Merkel, Stutensee (DE); Uwe Zimmermann, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 823 days.

(21) Appl. No.: 12/085,010

(22) PCT Filed: Oct. 18, 2006

(86) PCT No.: PCT/EP2006/067545
§ 371 (c)(1),
(2), (4) Date: Mar. 5, 2009

(87) PCT Pub. No.: WO2007/054422
PCT Pub. Date: May 18, 2007

(65) Prior Publication Data
US 2009/0303099 A1 Dec. 10, 2009

(30) Foreign Application Priority Data
Nov. 14, 2005 (DE) .......................... 10 2005 054 135

(51) Int. Cl.
*G01C 3/08* (2006.01)

(52) U.S. Cl. ...................... 356/5.01; 356/3.01; 356/4.01; 356/5.1

(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| 4,970,519 | A | * | 11/1990 | Minnis et al. ................ 342/165 |
| 5,638,164 | A | * | 6/1997 | Landau ....................... 356/5.01 |
| 6,050,945 | A | * | 4/2000 | Peterson et al. ............. 600/443 |
| 2002/0107637 | A1 | | 8/2002 | Okamura et al. |
| 2002/0177953 | A1 | | 11/2002 | Okamura et al. |
| 2005/0276163 | A1 | * | 12/2005 | Moon et al. .................... 367/92 |

FOREIGN PATENT DOCUMENTS

| DE | 39 12 704 | 10/1990 |
| GB | 1 253 734 | 11/1971 |
| GB | 1 376 702 | 12/1974 |
| GB | 1376702 | * 12/1974 |

* cited by examiner

*Primary Examiner* — Luke Ratcliffe
(74) *Attorney, Agent, or Firm* — Kenyon & Kenyon LLP

(57) ABSTRACT

A method for the detection of surroundings is performed using a source which emits pulsed signals. Signals backscattered from an object are detected by a sensor. When performing the method, a presence of the object is detected during coarse sampling. To determine a variable related to the detected object, operating parameters of the source are set for fine sampling.

12 Claims, 4 Drawing Sheets

METHOD FOR THE DETECTION OF SURROUNDINGS

BACKGROUND INFORMATION

A method for directly sampling a backscatter curve is typically used for the detection of surroundings. However, a disadvantage of this method is that it requires very high-speed analysis electronics for A/D conversion and for achieving high data transmission rates and/or high signal processing rates.

The so-called boxcar method, which is also used for the detection of surroundings, has the disadvantage that a complete backscatter curve is first provided after m*n pulses, where m is the number of resolution cells and n is the number of pulses which are averaged within a resolution cell. At low pulse-pause ratios of 1:1000, e.g., in the case of laser diodes, a measuring time is thus increased by approximately 30 µs per measured point or distance cell, so that, inter alia, an analysis system idles for a longer period of time.

SUMMARY OF THE INVENTION

The method according to the present invention for the detection of surroundings is performed using a source which emits pulse signals. Signals backscattered from an object are detected by a sensor. When performing the method, a presence of the object is detected during coarse sampling. To determine a variable related to the detected object, operating parameters of the source are set for fine sampling.

The present invention additionally relates to a device for the detection of surroundings, which is implemented in particular for performing the method according to the present invention. The device has a source which emits pulsed signals, and a circuit system, the circuit system having a reference pulse coil for generating a reference pulse in an input path on a primary side of an RF transmitter.

The present invention additionally relates to a computer program having program code means to perform all steps of the method according to the present invention when the computer program is executed on a computer or a corresponding arithmetic unit, in particular a control unit in the device according to the present invention.

Moreover, the present invention relates to a computer program product having program code means, which are stored on a computer-readable data carrier, to execute all steps of the method according to the present invention when the computer program is executed on a computer or a corresponding arithmetic unit, in particular a control unit in the device according to the present invention.

Using the present invention, a possibility is provided for the detection of surroundings using a boxcar method for pulsed sensor systems, e.g., lidar. Varying a pulse-pause ratio, a so-called duty cycle, is not known for boxcar methods. The pulse-pause ratio, also referred to as the sampling ratio, indicates a ratio of a length of an on state and thus a pulse duration to a period duration in a square-wave signal.

Using the method, cost-effective analysis is possible with coverage of a great distance range of, for example, 0.1 m to 80 m, in particular with the aid of laser diodes or infrared-emitting diodes (IRED) as the sources used. Typical delay components or their refinements thereof, e.g., "CC850" from Robert Bosch GmbH, having a maximum delay corresponding to a distance of 30 m, are to be used. Peripherals already existing around the delay component may be used for the analysis, measured data processing, end of tape check, and autocalibration.

The present invention may be used with known methods for measuring backscatter curves for propagation time determination in distance-measuring sensors using pulse operation, ultrasound, lidar, or radar. The variable related to the object may be a relative distance or a relative velocity of the object with respect to the device.

Using the method, finer location resolution of backscatter curves and thus less effort in processing of the signals result in comparison to direct sampling. The operating parameters of the source are preferably varied as a function of distance.

The provided implementation of the device has the advantage that an end of tape compensation only has to be performed for components or parts which are not located in a calibration chain of the circuit system. The end of tape compensation may be dispensed with if a scattering of the propagation times in the components which are not detected is so low that it is below the required measurement precision. The present invention thus only requires a minimal signal-technology engagement in high-sensitivity reception paths of known calibration circuits, which are now to be easily retrofitted with the reference pulse coil. Using the device, a method for autocalibration during direct sampling of backscatter signals may additionally be performed. The source may be connected to the circuit system; the operating parameters of the source are settable by the circuit system, for example.

By multiple uses of the RF transmitter, only one further primary winding and one additional switch are needed, and only a low component outlay is required. An additional switch in a transmission path is not necessary. A width of a reference peak which determines a number of sampling points is settable for adaptation to a light pulse incident in normal operation.

Typical application circuits are used for injecting analog signals into A/D converters via RF transformers with as little interference as possible. Using the present invention, the adapted RF transmitter for feeding the reference pulse is now provided for determining propagation times in calibration circuits. Using the present invention, autocalibration with direct sampling of backscattered signals for propagation time measurement in sensors for the detection of surroundings is possible using pulse operation, ultrasound, lidar, or radar. Generating or feeding the reference signal only slightly influences a function of typical application circuits.

Thermal drifts of propagation times in components of the device may be compensated by using temperature sensors. In a lidar system, components, e.g., laser diode drivers, have significantly temperature-dependent propagation times. Components of the device which have propagation times to be viewed as constant in regard to a desired measurement precision are, for example, laser diodes, receiver diodes, and amplifiers as possible components of the source.

DETAILED DESCRIPTION

Figure 1:
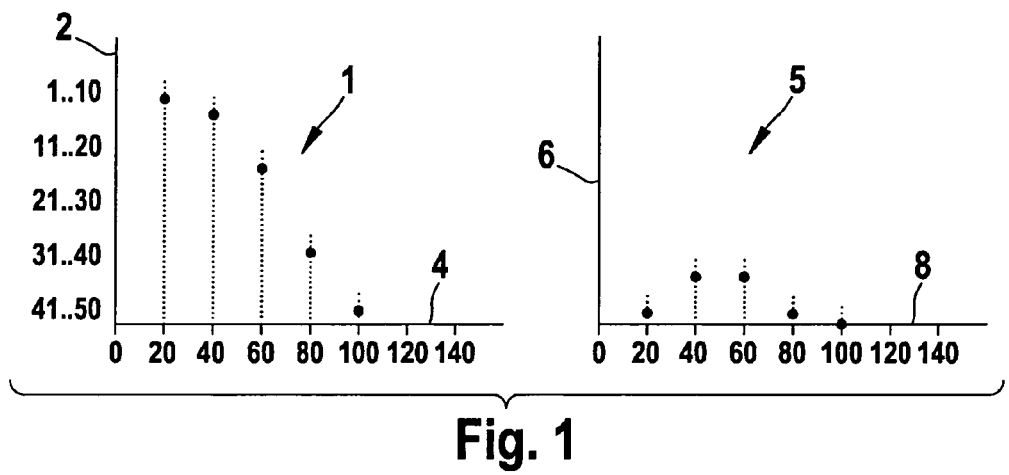
FIG. 1 shows two diagrams of a principle of a boxcar method.

A principle of the boxcar method is shown on the basis of two diagrams in FIG. 1. In diagram 1 shown on the left, a number of measurement pulses are plotted along an ordinate 2 over a number of distance cells along an abscissa 4. According to this diagram 1, signal averaging is performed over each ten pulses. A result follows on the basis of the signal averaging according to diagram 5 shown on the right, in which an intensity along an ordinate 6 is plotted against time along an abscissa 8. This result provided here results after 50 measured pulses. In the boxcar method, slow motion measurement is performed. Sampling of a repeating signal is thus performed at different points in time, which may be implemented by a time delay circuit. A specific number of pulses are analyzed per set time delay; this is performed here by summation over each 10 pulses.

In the boxcar method, the local resolution is given by the dimension of a time delay and/or a delay step, for example, with 1000 delay steps at 30 m distance; this corresponds to a delay step of 200 ps.

Because individual data points arrive relatively slowly in the boxcar method, for example, one data point per pulse, the amount of data to be transmitted and/or calculated is comparatively low. The distance resolution is thus significantly better than with the method of direct sampling of the backscatter curve, in which the location resolution is given by a sampling rate of an A/D converter. In typical delay components, e.g., "CC8502" from Robert Bosch GmbH, a function for calibrating distance steps is additionally provided, which makes compensation of a sensor system at the end of tape significantly easier.

An advantage of the method of direct sampling of the backscatter curve is that all points of the backscatter curve are provided after one pulse, this corresponding to a period of time which the light needs to cover a maximum distance, e.g., 500 ns at a maximum distance of 75 m. These points may be processed further after transmission to analysis electronics.

Figure 2:
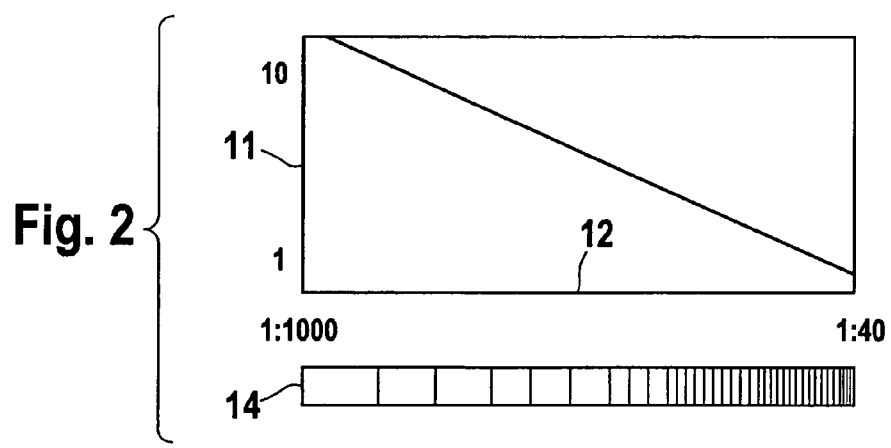
FIG. 2 shows a diagram of a first example of a light output which may be emitted via a pulse-pause ratio for a laser diode.

For long-range lidar systems, laser diodes having high pulse powers are used, which are operated at a pulse-pause ratio (duty cycle) of 1:40 to 1:1000. By reducing a pulse power it is possible to operate laser diodes using an increased duty cycle. For this purpose, the pulse power is plotted along ordinate 11 against the duty cycle along abscissa 12 as an example in the diagram from FIG. 2. A bar 14 shows a number of delay steps.

In the present method, the boxcar method, which is more favorable in regard to analysis, resolution, and calibration, is used over a greater distance range, also with sources or light sources which may be operated using variable duty cycles, for example.

Figure 3:
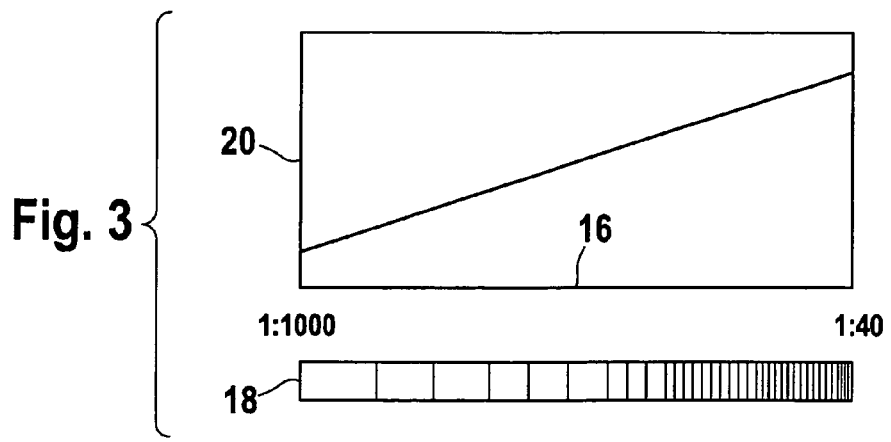
FIG. 3 shows a diagram of a second example of a light output which may be emitted via a pulse-pause ratio for a laser diode.

In the diagram from FIG. 3, it is illustrated in this regard that at a low pulse-pause ratio, which is plotted along an abscissa 16, a number of the delay steps (bar 18) may be reduced to keep a total measuring time for a complete backscatter curve minimal. A resolution capability is thus reduced, which corresponds to a coarse scan at a higher pulse power. A number of delay steps (local resolution) and/or a number of sampling points per delay step is/are plotted along ordinate 20 here. At high pulse powers, the number of pulses over which averaging is performed may be reduced to shorten the measuring time for the backscatter curve. An optimal performance capability may be achieved for every operating state by suitable selection of the parameters duty cycle, number of distance cells, and number of averaging operations per distance cell.

Figure 4:
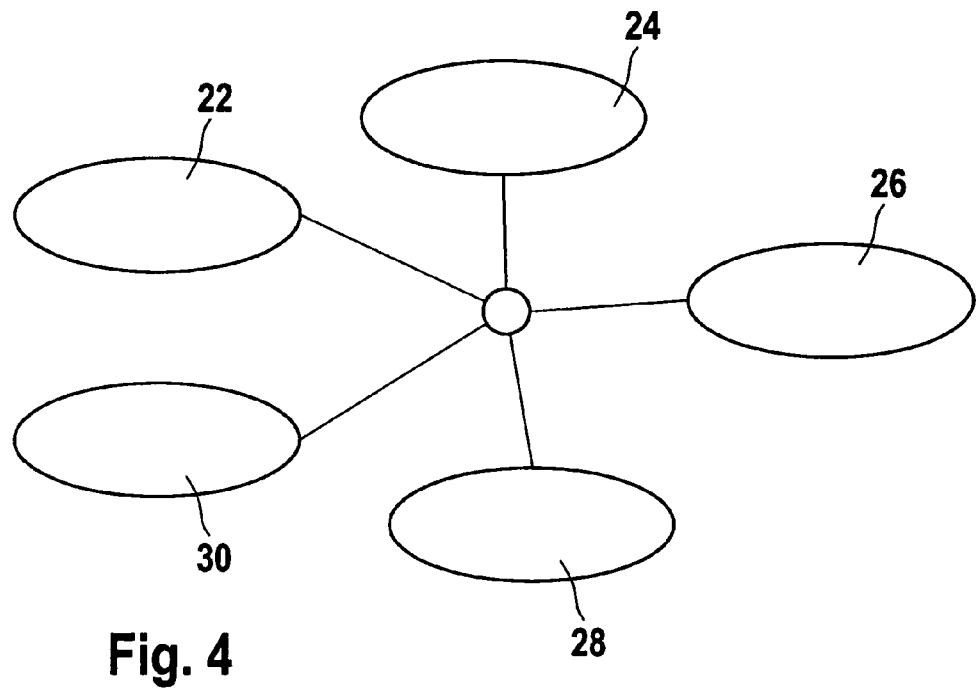
FIG. 4 shows a diagram of a relationship of operating parameters.

An interaction of the operating parameters duty cycle 22, resolution capability 24, averaging operations per distance cell 26, measuring time of a backscatter curve 28, and pulse power 30 is shown in the diagram from FIG. 4. In the present method, to detect the presence of objects in principle, first a coarse scan is performed using the source at maximal pulse power and minimal duty cycle 22, coarse distance resolution 24, and minimal number of averaging operations per distance cell 26. If objects are detected, the operating parameters are set, preferably as a function of distance. In a fine scan following the coarse scan, the light output is reduced and therefore duty cycle 22, distance resolution 24, and possibly the number of averaging operations per distance cell 26 are increased, so that a mode of operation or performance of the device is optimal; this includes an acceptable measurement time for the backscatter curve, eye safety, service life of the laser diode, and/or range.

Figure 5:
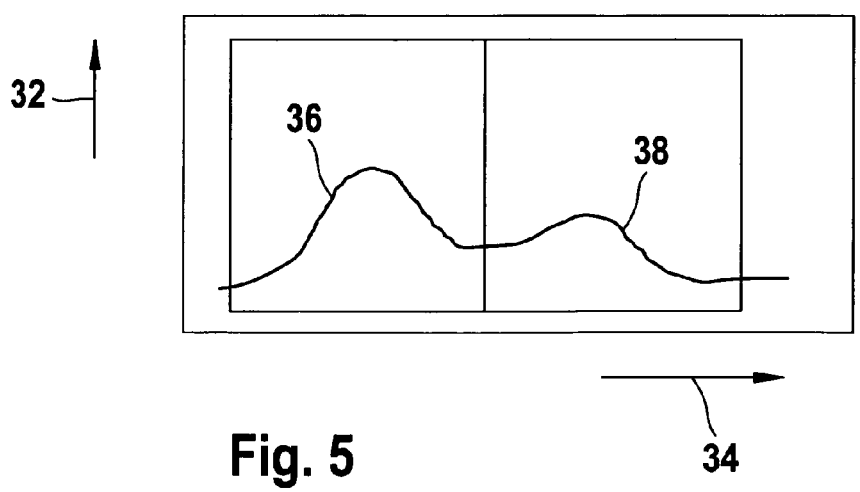
FIG. 5 shows an example of a distance-dependent adaptation of operating parameters.

In addition, a distance-dependent adaptation of the operating parameters may be performed within one measurement cycle of the backscatter curve to measure multiple targets in a detection area or environment optimally. For this purpose, an intensity 32 of a backscatter is plotted against the distance in the diagram from FIG. 5. The diagram shows a backscatter curve for a first set 36 on the left and a backscatter curve for a second set 38 on the right for distance-dependent operating parameters.

Figure 6:
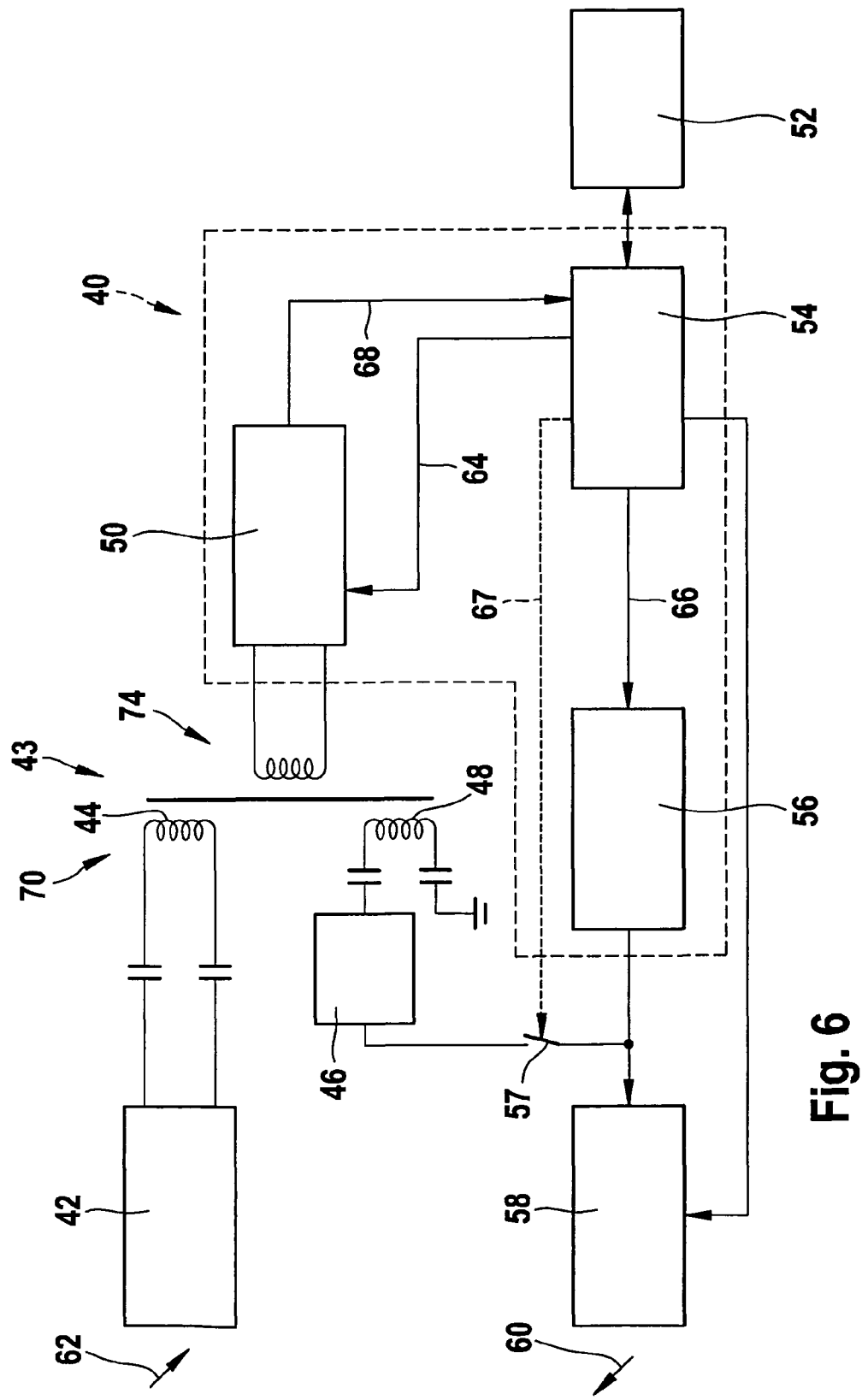
FIG. 6 shows a schematic illustration of a preferred specific embodiment of a circuit system of a device.

A block diagram of a circuit system 40 of an exemplary embodiment of the device according to the present invention is shown in FIG. 6. This circuit system 40 includes a receiver diode 42 having an amplifier, an RF transmitter 43, a signal winding 44, a pulse shaping unit 46, a reference winding 48, an analog/digital (A/D) converter 50, an analysis unit 52, which does not produce any propagation time effects here, a control unit 54, a transmitter diode driver 56, a switch 57, and a transmitter diode 58 having intensity control as the source. Transmitter diode 58 having intensity control is provided for emitting light pulses 60 and receiver diode 42 having an amplifier is provided for receiving light pulses 62. Operating parameters of the device and in particular of the source including transmitter diode 58 are settable depending on whether a coarse scan or fine scan is to be performed.

In normal operation of the device, a converter pulse 64 is sent to A/D converter 50 from the control unit 54 during measurement of the light propagation time. At a defined pulse flank of converter cycle 64, a pulse 66 is generated by control unit 54, which is emitted as a light pulse 60 by transmitter diode 58 after a specific propagation time through the electronics of the measuring device. Switch 57 is switched over by a release pulse 67 produced by control unit 54. Emitted light pulse 60 is reflected from an object as light pulse 62. This light pulse 62 reaches receiver diode 42 and is converted in a receiver circuit into an electrical pulse, which is converted in A/D converter 50 into a digital data word 68, which finally reaches control unit 54 again. The backscatter curve is composed of data words 68 for a specific number of converter pulses. This backscatter curve is processed further in a signal processing unit, in which its peak position is determined.

To detect the analog signals here with as little interference as possible, a differential measurement of the signals with common-mode rejection is advantageously performed. Coupling capacitors are used for decoupling direct components.

In addition to signal winding 44 for the signal, the reference pulse winding for the reference pulse generated by the device is additionally applied to a primary side 70 of RF transmitter 43. A service cycle for measuring the position of the reference pulse is executed essentially like the determination of the position of light pulse 62. The difference is that electrical pulse 66 for resolving light pulse 60 is fed via a switch to primary side 70 of RF transmitter 43. The emission of light pulse 60 is suppressed, an intensity being equal to zero, so that no signal which could interfere with the reference pulse arrives at signal winding 44. The reference pulse, like light pulse 62 previously, is transmitted on a secondary side 74 of RF transmitter 43 and processed further to determine the peak position in the same way. A pulse shaping unit is also to be incorporated if needed to provide a constant propagation time behavior, in order to simulate light signal 62 arriving during normal operation, to which base signal processing is optimized as precisely as possible. A propagation time behavior may be determined by components 50, 54, 56, which are enclosed by dashed lines, because of the design of circuit system 40.

Interference in the normal operation is minimized by the injection provided here. In addition, no additional switch is required in the transmission path when the intensity of transmitter diode 58 is set to zero as described in the exemplary embodiment. In comparison to capacitive coupling of the signal, which is also possible, the advantages of coupling via RF transmitter 43 are maintained with common-mode rejection and electrical isolation.

Figure 7:
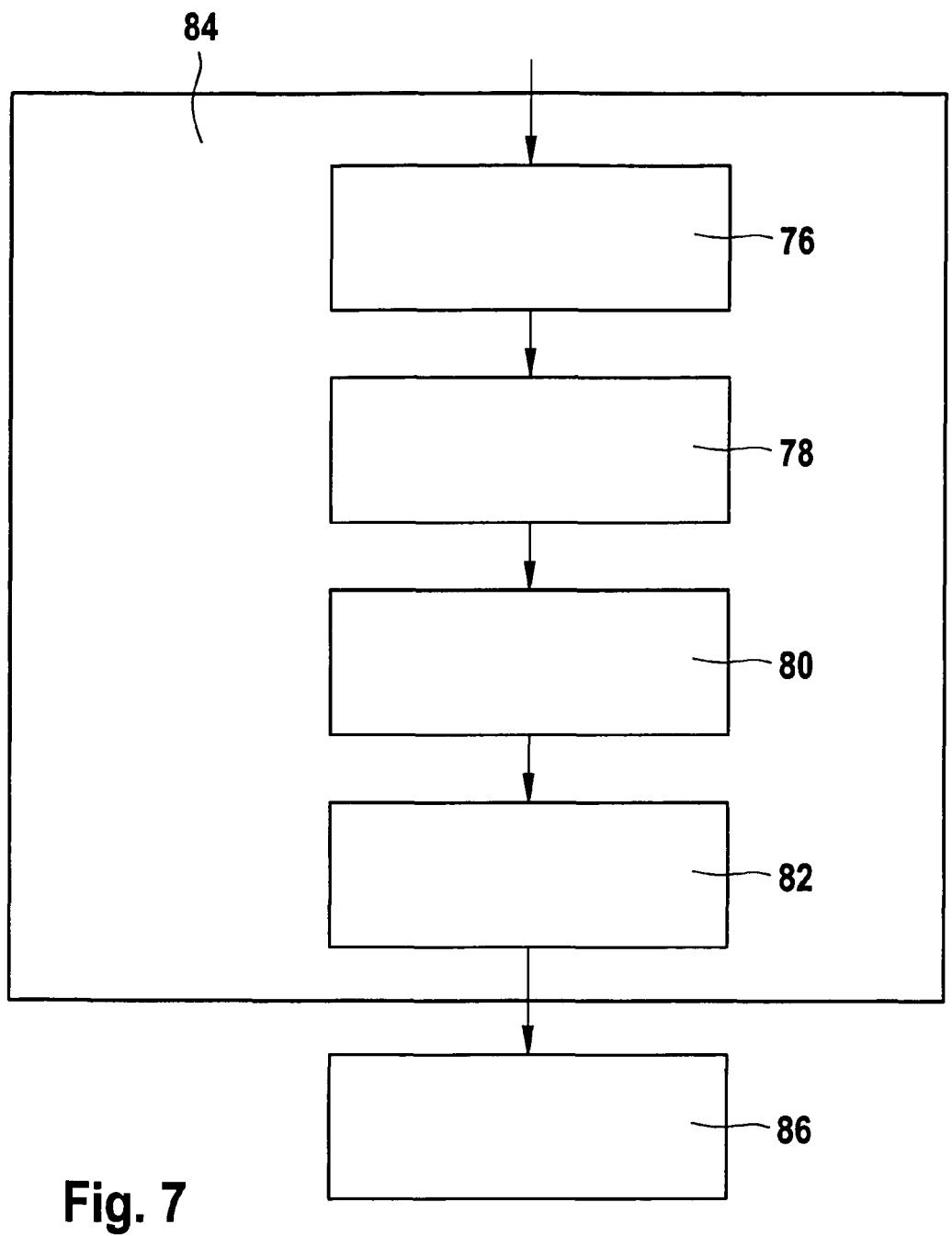
FIG. 7 shows a flow chart of a calibration.

The diagram shown in FIG. 7 shows a sequence of a calibration of the device according to the present invention. In four steps 76, 78, 80, 82, a service cycle 84 is performed to determine the propagation times of the components presented in FIG. 6. For this purpose, in first step 76, an emission intensity of transmitter diode 58 (FIG. 6) is minimized. In second step 78, switch 72 (FIG. 6) for the reference pulse is closed, in third step 80, light pulse 60 (FIG. 6) having settable length is emitted, and in fourth step 82, the position of the reference pulse is ascertained for ascertaining the propagation times in components 50, 54, 56 (FIG. 6) of the measuring device. In a last step 86, the propagation time ascertained via the analysis of the reference pulse is subtracted from the propagation time of light.

What is claimed is:

1. A device for the detection of surroundings, comprising:
   a source, which emits pulsed signals; and
   a circuit system, which includes a reference pulse winding for generating a reference pulse at a first input terminal in an input path on a primary side of an RF transmitter, wherein a second input terminal in the input path on the primary side of the RF transmitter receives a pulse corresponding to a reflected one of the emitted pulsed signals.

2. The device according to claim 1, wherein the pulsed signals have a variable pulse-pause ratio.

3. A method for the detection of surroundings, comprising:
   emitting pulsed signals using a source;
   detecting signals backscattered from an object using a sensor;
   detecting a presence of the object along with a distance to the object during coarse sampling; and
   setting operating parameters of the source for fine sampling to determine a variable related to the detected object;
   wherein:
   the operating parameters of the source are set for performing the fine sampling as a function of the detected distance to the object; and
   a distance-dependent adaptation of the operating parameters is performed within one measurement cycle of a backscatter curve generated based on the backscattered signals.

4. The device according to claim 1, further comprising at least one further component, the reference pulse being implemented to determine a propagation time of the at least one further component.

5. The device according to claim 1, further comprising a sensor for sampling pulsed signals which are backscattered from an object.

6. The device according to claim 1, wherein the device is for determining a distance to an object.

7. The method according to claim 3, wherein a pulse-pause ratio is set to a minimum level and a pulse power is set to a maximum level to perform the coarse sampling.

8. A method for the detection of surroundings, comprising:
   emitting pulsed signals using a source;
   detecting signals backscattered from an object using a sensor;
   detecting a presence of the object along with a distance to the object during coarse sampling; and
   setting operating parameters of the source for fine sampling to determine a variable related to the detected object;
   wherein:
   the operating parameters of the source are set for performing the fine sampling as a function of the detected distance to the object;
   the backscattered signals are analyzed using a boxcar analysis in which a predetermined number of measurement pulses are averaged over each of a plurality of distance cells;
   the number of measurement pulses averaged per distance cell is set to a minimal number during the coarse sampling; and
   the number of measurement pulses averaged per distance cell is increased during the fine sampling.

9. The device of claim 1, further comprising:
   a control unit that performs a calibration procedure by determining an internal propagation time of the circuit system based on the reference pulse and subtracting the internal propagation time from a determined propagation time corresponding to the received pulse.

10. The method according to claim 3, wherein the pulsed signals have a variable pulse-pause ratio.

11. The method according to claim 8, wherein the pulsed signals have a variable pulse-pause ratio.

12. The method according to claim 8, wherein a pulse-pause ratio is set to a minimum level and a pulse power is set to a maximum level to perform the coarse sampling.

* * * * *